Oct. 22, 1963   P. C. VAN DER WILLIGEN ETAL   3,108,020
COATED WELDING ELECTRODES AND METHODS OF MAKING SAME
Filed Oct. 21, 1960
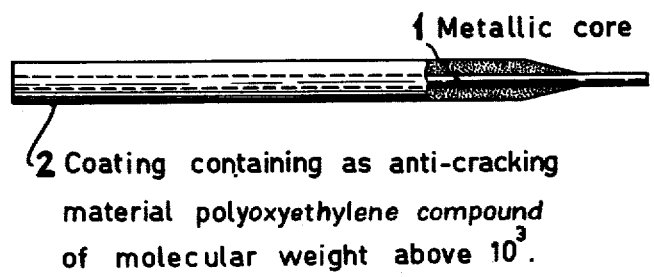
1 Metallic core
2 Coating containing as anti-cracking material polyoxyethylene compound of molecular weight above $10^3$.
INVENTOR
PAUL C. VAN DER WILLIGEN
JELIS DE JONGE
BY
AGENT

United States Patent Office 3,108,020
Patented Oct. 22, 1963

3,108,020
COATED WELDING ELECTRODES AND METHODS
OF MAKING SAME
Paul Christiaan van der Willigen and Jelis de Jonge, both
of Emmasingel, Eindhoven, Netherlands
Filed Oct. 21, 1960, Ser. No. 66,377
Claims priority, application Netherlands Oct. 24, 1959
7 Claims. (Cl. 117—202)

Our invention relates to coated welding electrodes, plastic coating compositions therefor, and to methods of making the same.

Welding electrode coatings are formed on a metallic core by molding or extruding a plastic coating composition or paste consisting essentially of a mixture of several slag-forming components and a plurality of additional substances which modify the properties of the coating composition and the coating electrode. The slag-forming components usually employed are one or more of the materials feldspar, bentonite, kaoline, talc, rutile, ferrioxide, calcium carbonate, asbestos, manganese oxide and calciumfluoride. Additional substances usually employed are, for example, binders, such as sodium or potassium silicates, and stabilizers such as feldspar, carbon hydrates and titanates. In addition to the above materials the coating compositions may also contain substances having oxidizing or reducing properties, metallic powders, and materials, referred to herein as molding and extrusion means, which facilitate the molding or extrusion, such as bentonite, kaoline and alginates. The plastic coating composition also contains a certain amount of water which is expelled by heating after the composition has been formed into the coating on the metallic core.

During the above heating it is very difficult to prevent the occurrence of fissures or cracks in the coating, and in an attempt to avoid this it has been the usual practice to subject the electrodes with the moist coating thereon to a pre-drying treatment at a temperature below about 100° C. However, such pre-drying is frequently insufficient, particularly with thick coatings, to prevent cracking with the result that there is still considerable loss due to cracking of the coating. In the case of welding electrodes having a thick coating, for instance above 2 mms., it is sometimes necessary to place the electrodes with the moist coating thereon on holders and to pre-dry the same in air for several days, usually at room temperature. It has also been proposed to transport the electrodes through a drying oven while blowing water vapor into the oven. However, the above measures not only complicate the manufacture and increase the cost of the electrodes, but generally do not maintain below reasonable limits the loss or shrinkage due to cracking of the coatings.

In accordance with the invention we overcome the above-described difficulties due to cracking of the coating by incorporating in the coating composition, as anti-cracking means, a polyoxyethylene compound having a molecular weight of the order of at least $10^3$, and having the general formula $(CH_2—CH_2O)_n$ in which $n$ is equal to 20 or more. Such compounds are water soluble and consist substantially of a straight chain.

Examples of polyoxyethylene compounds suitable for carrying out the invention are the compounds sold under the trademarks "Carbowax," "Polyox" and "Polywachs." Particularly suitable for carrying out the invention are the compounds "Polyox 205" which is a polyoxyethylene having a mean molecular weight of $10^6$, "Polywachs 6000" which is a polyoxyethylene having a mean molecular weight of 6000 and "Carbowax 4000" which is a polyoxyethylene having a mean molecular weight of 4000.

The amount of polyoxyethylene compounds used lies between about 0.5% to 3% by weight of the total weight of the dry-ingredients of the plastic coating composition. Generally rather small quantities, for instance between about 0.5% and 2% by weight, are sufficient to obtain the proper anti-cracking action, and in some cases the use of more than 3% causes some decrease of the anti-cracking action.

When using, as the anti-cracking compounds, polyoxyethylene having a molecular weight of the order of at least $10^5$, we obtain not only the advantage of preventing the formation of cracks during the drying but the additional advantage that the compounds also act entirely or partly as a means for facilitating the molding or extrusion. However, we have found that for practical reasons it is difficult to use polyoxyethylene as a binder. More particularly, when omitting the usual binder, waterglass, it is necessary to add from 5% to 10% of polyoxyethylene by weight of the dry ingredients of the coating composition in order to obtain a proper binding action. Compositions containing such amounts of polyoxyethylene have the disadvantage that, when drying at about 100° C., cracking occurs in the coating and, if the coating is one which must be baked at a temperature higher than 250° C., the polyoxyethylene dissociates and coherence of the coating completely disappears. When using waterglass as a binder the addition of polyoxyethylene in the coating does, of course, prevent the occurrence of cracks during the drying.

Immediately after welding rods are coated by molding or extrusion with a plastic coating composition containing the anti-cracking means acording to the invention they can be dried in an oven having a temperature which is increased to 120° C. without the occurrence of fissures or cracks. Even with coatings having thicknesses as high as 4 mms. it is unnecessary to utilize complicated and expensive expediencies, such as supporting the electrodes on holders or blowing water vapor into a drying oven.

We are aware of the fact that it has been proposed to incorporate in the coating compositions, as molding or extrusion means, certain polymeric water-soluble polyelectrolytes materials which also prevent cracking of the coating during drying. However, such materials have the disadvantage that they are usually not inert chemically or consist of metal salts so that at the drying temperature used there are formed in the coating free metal oxides which are hygroscopic. In addition, several of these materials contain sulphur or nitrogen, which may produce undesired results when using welding rods thus coated. For example, the sulphur may cause porosity of the welds thereby increasing the tendency of the weld to crack. Nitrogen causes an unpleasant odor during the welding, whereas its presence in the welding metal is highly undesirable.

In order that the invention may be clearly understood and readily carried into effect, we shall describe the same with reference to several specific examples of coatings embodying the invention, several comparative examples, and with reference to the accompanying drawing in which the single figure is a side view of a coated welding electrode according to the invention.

The electrode shown in the drawing comprises a core 1 which has a diameter of 5 mms., but which may be of any of the usual diameters, for example between 1.5 and 13 mms. Core 1 is of soft steel, but may consist of any of the conventional metals or alloys such as stainless steel, nickel, bronze and Monel. Core 1 is provided with a coating 2 which is described in Example I and which, in accordance with the invention, contains as an anti-cracking material polyoxyethylene compound of molecular weight above $10^3$. Coating 2 has a thickness of about 2.5 mms., the total diameter of the coated electrode being 10 mms. However, various thicknesses generally used in coated electrodes, for example between 0.25 and 4 mms.

may be applied. While the electrode shown in the drawing is of the contact type the invention extends to free-arc type electrodes.

*Example I*

The substances listed below of which the dry ingredients are all in a powdery form of such fineness that they all pass through a sieve DIN 10 (width of mesh 0.6 mm.) were mixed in a suitable mixing mill.

| | Grams | Percent by weight of ingredients |
|---|---|---|
| Calcarious spar ($CaCO_3$) | 200 | 18.1 |
| Fluorspar ($CaF_2$) | 100 | 9.1 |
| Ferrosilicon (45% of Si, rest Fe) | 35 | 3.2 |
| Silicon manganese (70% of Mn, 20% of Si) | 35 | 3.2 |
| Zircon silicate ($ZrSiO_4$) | 160 | 14.5 |
| Iron powder | 500 | 45.3 |
| Polyoxyethylene (molecular weight $10^6$) [1] | 20 | 1.8 |
| Sodium silicate waterglass 120 ccs. total content of dry substances | 55 | 5.0 |
| | | 100.2 |

[1] (For example in the form of "Polyox 205.")

After the dry materials were thoroughly mixed, the sodium silicate waterglass was added, after which the mixture was wet mixed for about 15 minutes. The resulting paste was then molded upon core 1 to form coating 2 and immediately after pressing the coating electrodes were dried in a drying cylinder in which the electrodes were heated up to a temperature zone of 120° C. in 20 minutes. It was found that this rapid drying did not result in any cracking of the coating. After being dried these basically-coated contact electrodes were baked at a temperature of 400° C. during which the polyoxyethylene dissociated.

*Example II*

Electrodes were made in the manner described in Example I with the exception that the "Polyox 205" was replaced by 15 grams of sodium alginate which is a conventional extrusion means. It was found that many longitudinal cracks occurred in the coating during the drying process used.

*Example III*

Electrodes were made according to Example II with the exception that 15 grams of polyoxyethylene having a molecular weight of the order of $10^3$, for example in the form of "Polywachs 6000" or in the form of "Carbowax 4000", were added. The resulting electrodes exhibited no cracking of the coating as a result of the drying process.

Examples II and III clearly show that the polyoxyethylene is especially active as an anti-cracking means. The polyoxyethylene also acts as a molding or extrusion means, but to a lesser degree than does alginates and in a satisfactory manner only for comparatively high molecular weights, i.e. about $10^5$.

*Example IV*

The following substances of the powder size given in Example I were dry mixed and wet mixed in the manner similar to that described in that example. It should be noted that in this case the 15 grams of polyoxyethylene having a molecular weight of $10^4$ together with the bentonite was sufficient to obtain a proper moldability of the paste. The resulting paste was formed into a coating of a thickness of about 1.5 mms. on a core with a diameter of about 5 mms., the total diameter of the coated electrode being 8 mms. and the resulting coated electrodes were subjected to the drying and baking described in Example I. It was found that there was no formation of cracks in the coatings during the quick drying process of Example I.

| | Grams | Percent by weight of ingredients |
|---|---|---|
| Calcarious spar | 360 | 36.1 |
| Fluorspar | 270 | 27.1 |
| Ferrosilicon | 80 | 8.0 |
| Ferromanganese (85% Mn) | 40 | 4.0 |
| Rutile ($TiO_2$) | 40 | 4.0 |
| Bentonite | 30 | 3.0 |
| Iron Powder | 100 | 10.0 |
| Polyoxyethylene (molecular weight about $10^4$) | 15 | 1.5 |
| Potash waterglass 130 ccs. total content of dry substances | 63 | 6.3 |
| | | 100 |

*Example V*

Coated rods were produced in the manner described in Example IV except that the 15 grams of polyoxyethylene was replaced by 15 grams of sodium alginate. The resulting electrodes showed considerable cracking of the coating after the drying process.

*Example VI*

Attempts were made to make satisfactory electrodes using the mixture of Example I except that waterglass was omitted and 20 grams of polyoxyethylene was increased to an amount between 50 grams and 75 grams, i.e. to 4.6% to 6.8% by weight, the polyoxyethylene previously being converted into a gel with the required quantity of water or not. After being dried it was found that the coating cracked to a considerable extent which shows that the polyoxyethylene is not a suitable replacement for the binder, such as waterglass.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

What is claimed is:

1. A plastic coating composition for welding rods comprising slag-forming components, a binder, and a polyoxyethylene compound having a molecular weight of the order of at least $10^3$ and being in an amount between about 0.5% to 3% by weight of the total weight of the ingredients.

2. A plastic coating composition for welding rods comprising slag-forming components, a binder, and a polyoxyethylene compound having a molecular weight of the order of at least $10^3$ and being in an amount equal to about 0.5% to 2% by weight of the total weight of the ingredients.

3. A plastic coating composition for welding rods comprising slag-forming components, a binder, and a polyoxyethylene compound having a molecular weight of the order of at least $10^3$, said compound having the general formula $(-CH_2-CH_2O-)_n$ in which $n$ is not less than 20 and being present in an amount equal to about 0.5% to 2% of the total weight of the dry ingredients.

4. A welding electrode comprising a metallic core and a dried coating formed on said core, said coating comprising slag-forming components, a binder and a polyoxyethylene compound having a molecular weight of the order of at least $10^3$ and being in an amount between about 0.5% and 0.3% by weight of the coating material.

5. A welding electrode comprising a metallic core and a dried coating formed on said core, said coating comprising slag-forming components, a binder and a polyoxyethylene compound having a molecular weight of the order of at least $10^3$ and being in an amount between about 0.5% and 2% by weight of the coating.

6. A welding electrode comprising a metallic core and a dried coating formed on said core, said coating comprising slag-forming components, a binder and a polyoxyethylene compound having a molecular weight of the order of at least $10^3$ and the general formula $$(CH_2-CH_2O)_n$$

in which $n$ is not less than 20 and being present in an amount equal to about 0.5% to 2% of the total weight of the coating.

7. A method of making a plastic coating composition for the coatings of welding electrodes comprising the steps of forming a mass comprising slag-forming components and a binder, and adding to the mass in an amount equal to about 0.5% to 2% by weight of the dry ingredients in the mass of a polyoxyethylene compound having a molecular weight of the order of at least $10^3$ and the general formula $(CH_2-CH_2O)_n$ in which $n$ is not less than 20.

References Cited in the file of this patent
UNITED STATES PATENTS

| | | |
|---|---|---|
| 2,547,771 | Pessel | Apr. 3, 1951 |
| 2,631,952 | Williams | Mar. 17, 1953 |
| 3,004,872 | Stark | Oct. 17, 1961 |

UNITED STATES PATENT OFFICE
CERTIFICATE OF CORRECTION

Patent No. 3,108,020            October 22, 1963

Paul Christiaan van der Willigen et al.

It is hereby certified that error appears in the above numbered patent requiring correction and that the said Letters Patent should read as corrected below.

In the grant, line 2, after "Netherlands," insert -- assignors to North American Philips Company, Inc., of New York, N. Y., a corporation of Delaware, --; lines 11 and 12, for "Paul Christiaan van der Willigen and Jelis de Jonge, their heirs" read -- North American Philips Company, Inc., its successors --; in the heading to the printed specification, line 5, after "Netherlands" insert -- , assignors to North American Philips Company, Inc., of New York, N. Y., a corporation of Delaware --;

Signed and sealed this 12th day of May 1964.

(SEAL)
Attest:
ERNEST W. SWIDER

Attesting Officer

EDWARD J. BRENNER
Commissioner of Patents